Sept. 21, 1954

C. N. COLSTAD 2,689,576

DISHWASHER

Filed Aug. 23, 1949

Inventor:
Charles N. Colstad
By
William E. Hall
Attorney.

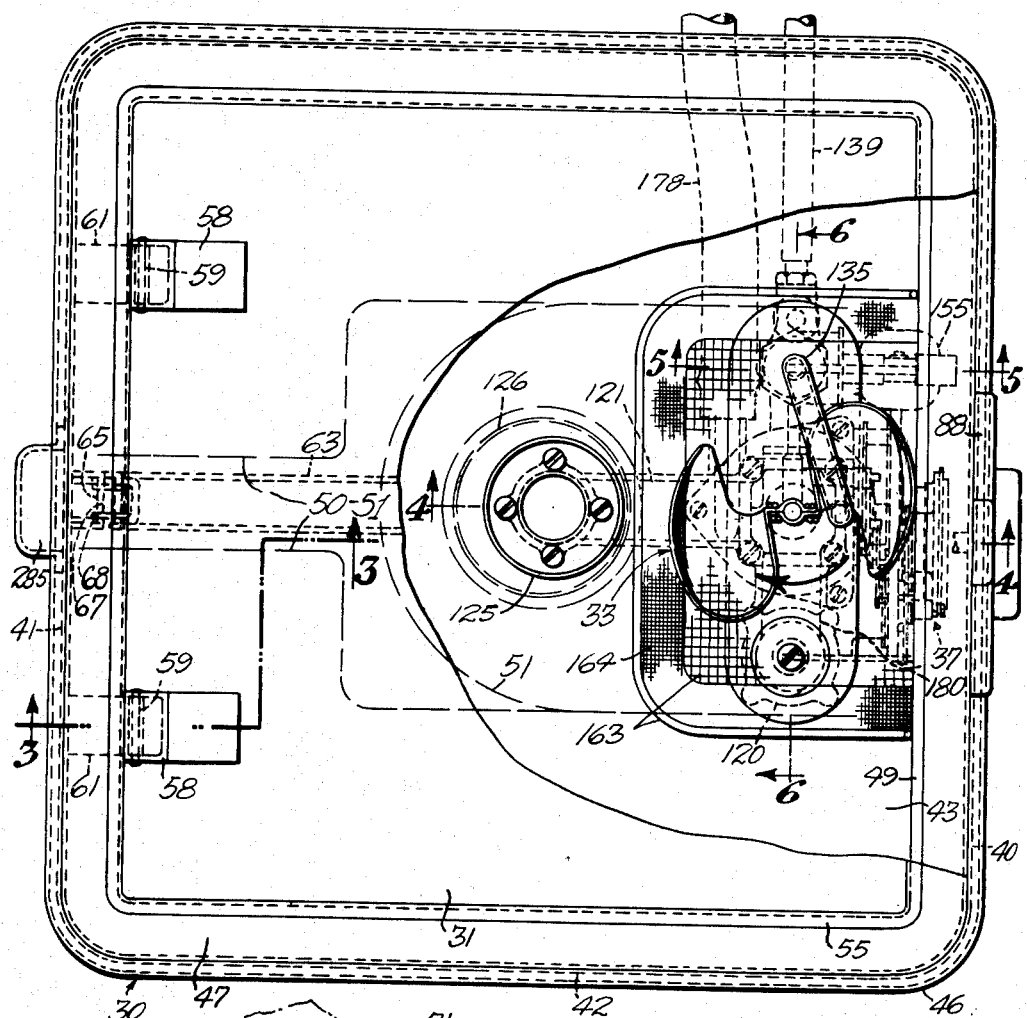
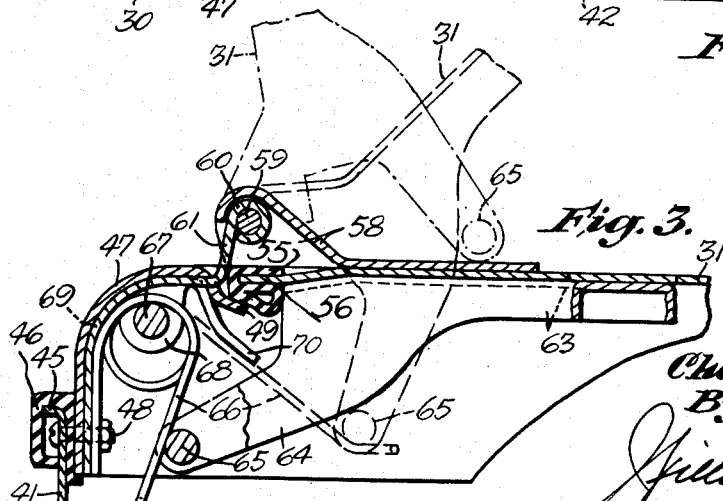

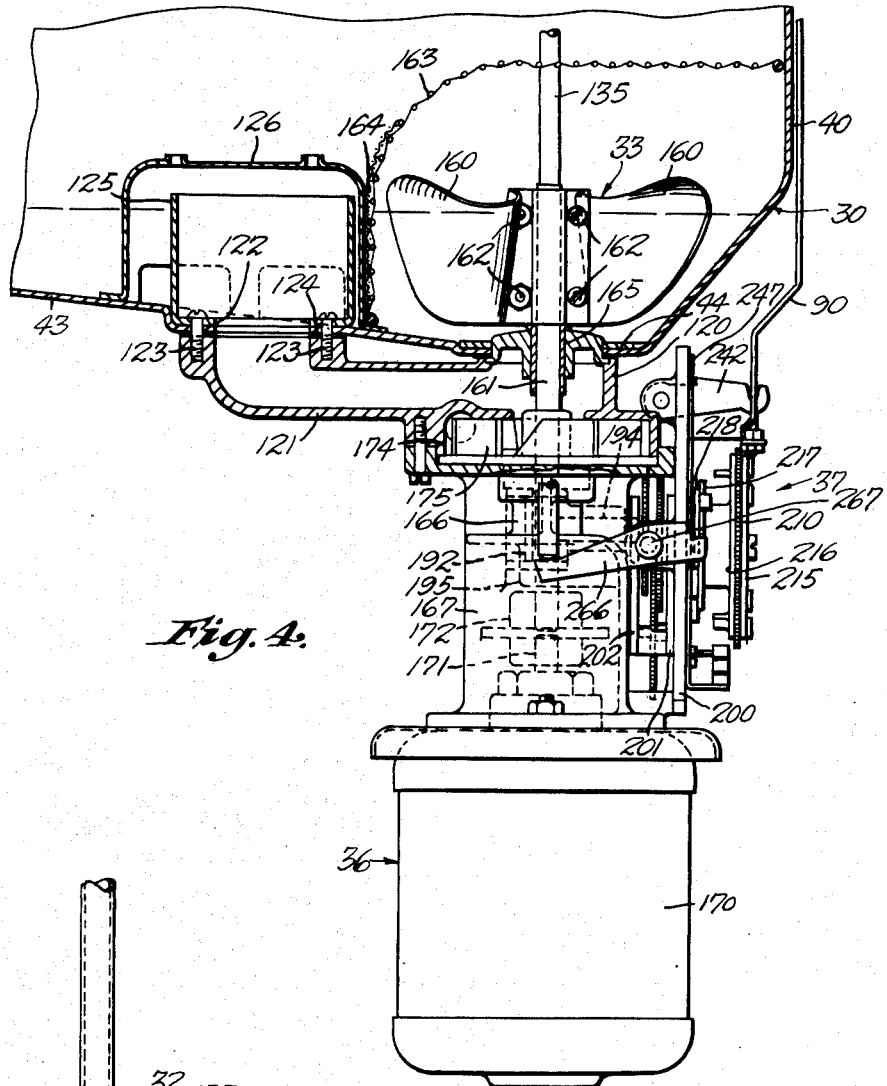
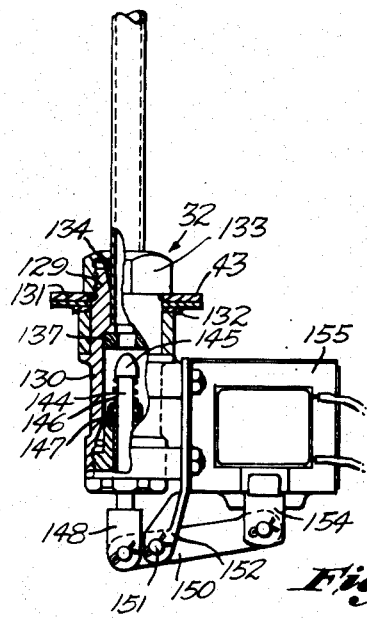

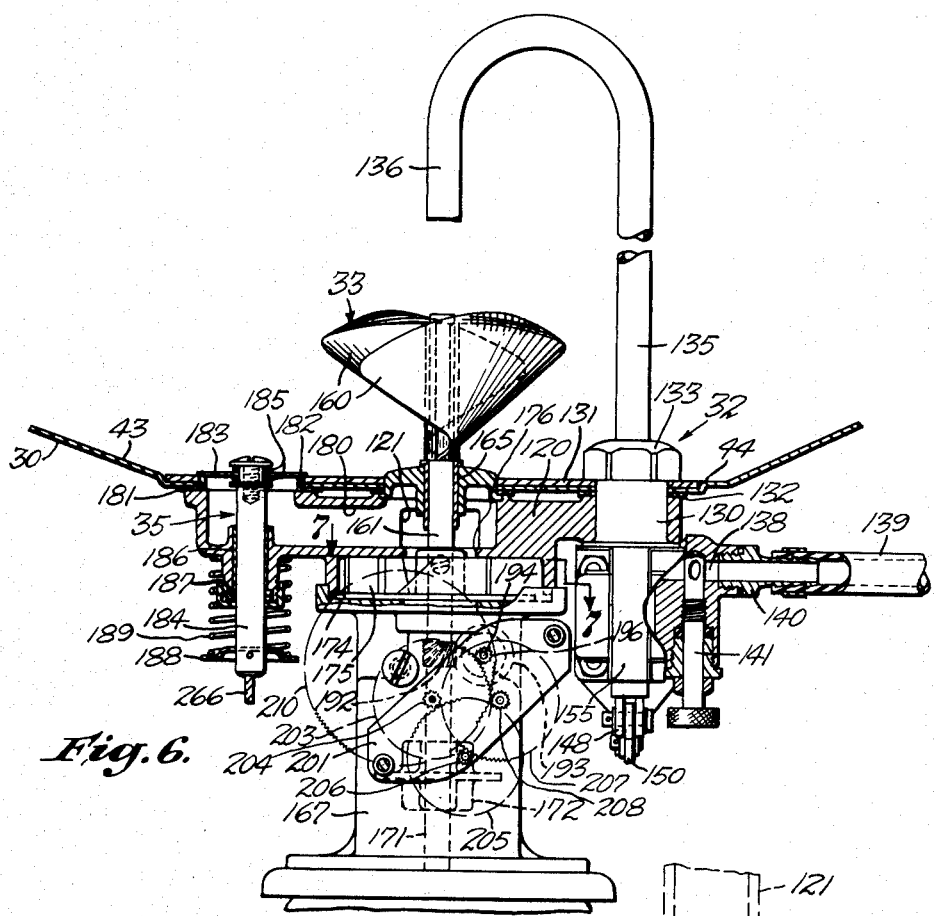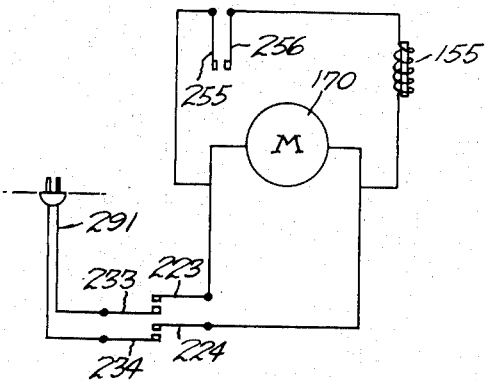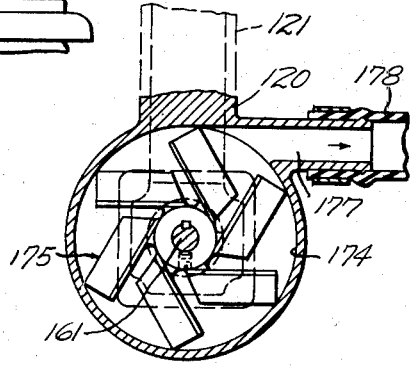

Sept. 21, 1954  C. N. COLSTAD  2,689,576
DISHWASHER
Filed Aug. 23, 1949  8 Sheets-Sheet 5

Inventor:
Charles N. Colstad
By
William E. Hall
Attorney.

Sept. 21, 1954          C. N. COLSTAD          2,689,576
                          DISHWASHER
Filed Aug. 23, 1949                        8 Sheets-Sheet 6

Inventor:
Charles N. Colstad
By
William E. Hall
Attorney.

Sept. 21, 1954 C. N. COLSTAD 2,689,576
DISHWASHER
Filed Aug. 23, 1949 8 Sheets-Sheet 7
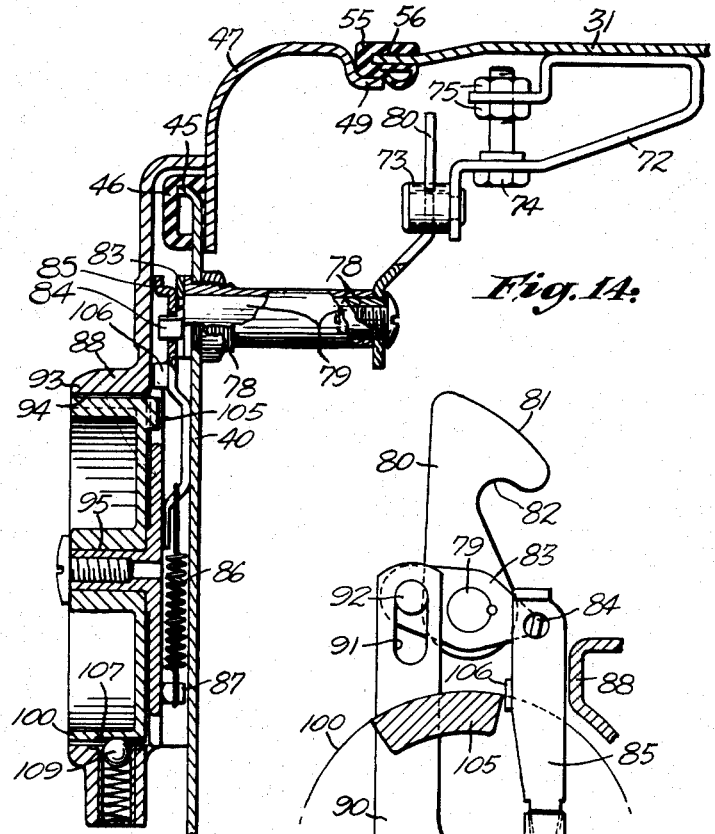
Fig. 14.
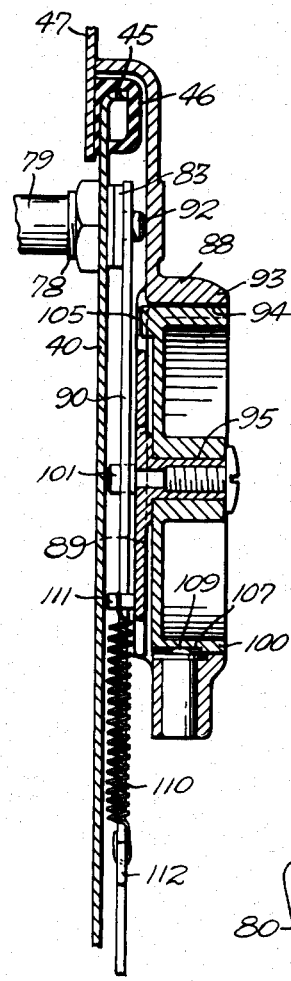
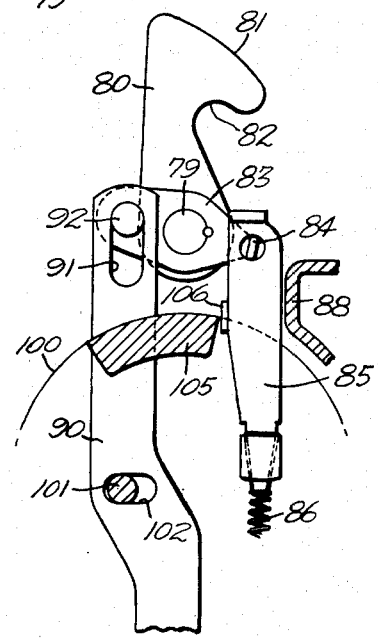
Fig. 16.
Fig. 15.
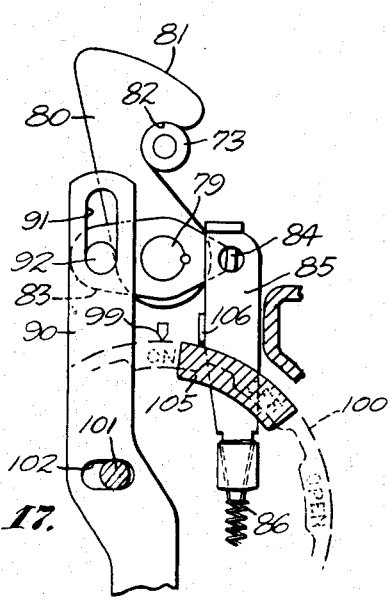
Fig. 17.
Inventor:
Charles N. Colstad
By
William E. Hall
Attorney.

Sept. 21, 1954  C. N. COLSTAD  2,689,576
DISHWASHER
Filed Aug. 23, 1949  8 Sheets-Sheet 8
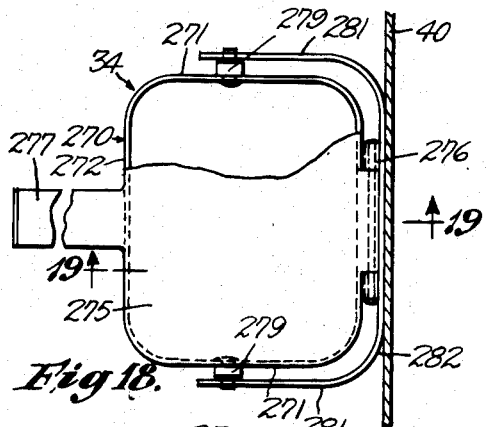
Fig. 18.
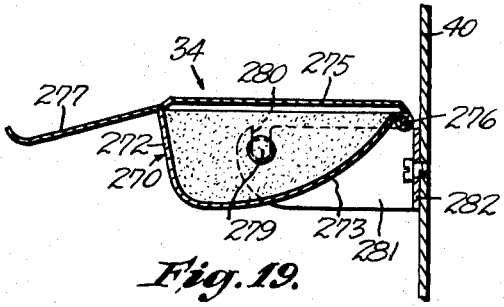
Fig. 19.
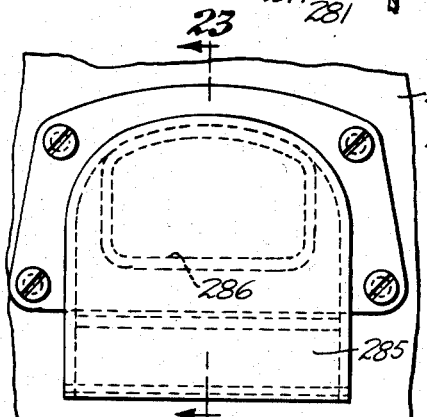
Fig. 22.  Fig. 23.
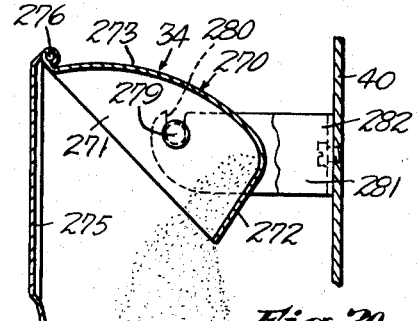
Fig. 20.
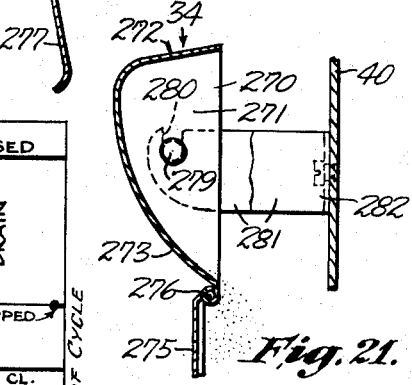
Fig. 21.
Inventor:
Charles N. Colstad
By
William B. Hall
Attorney.
Fig. 25.

Patented Sept. 21, 1954

2,689,576

UNITED STATES PATENT OFFICE 2,689,576

DISHWASHER

Charles N. Colstad, Los Angeles, Calif., assignor of one-third to Marion F. Le Clercq, as administratrix of the estate of Raymond Gabriel Le Clercq, deceased Application August 23, 1949, Serial No. 111,925

17 Claims. (Cl. 134—58)

My invention relates to a machine for washing dishes, and the like.

One of the principal objects of this invention is to provide a machine of this class which is fully automatic throughout its operating cycle from the time it is manually turned on by the user till it is automatically shut off.

An important object of this invention, in order to eliminate the usual or former complicated and costly construction, is the consolidation or embodiment of various necessary features or functioning elements, such as the water or other liquid supply valve, drain valve, overflow, drain pump, wash impeller, automatic timer-control, and electric or other driving motor, in such an arrangement as to comprise a simple and compact whole which may be readily attached as a unit to a tub element or receptacle to provide the complete machine.

Another important object of this invention is to provide a machine which is designed and constructed, as aforementioned, so that all parts are readily accessible, or so that the operating elements may be readily dismantled for making alterations and repairs.

Another important object of this invention is to provide a dishwasher having a novel arrangement of an impeller within the tub element or receptacle whereby greater amounts of water, or other cleaning liquids, are thrown in different directions or at different velocities for effectively cleaning different dishes or articles, particularly in which a greater amount of water is directed toward or over silverware, or the like.

Still another important object of this invention is to provide a novel detergent-charging means whereby detergent may be automatically deposited into the water, or other liquid, when the cycle is progressed to the stage when the detergent is desired, and in which the detergent is so deposited or discharged thereinto by the water or liquid itself when directed toward the detergent container in predetermined amounts.

A further important object of this invention is to provide manual control means whereby the operator may lock or unlock the tub cover, and start or stop the machine by turning a dial provided for the purpose, the dial being mechanically interconnected with the cover-latch and auto-control-timer in such manner as will allow the machine to start only if the cover is in a closed position, thus preventing the flooding which would result if the machine were started with the cover open; and further to provide a control means that when the machine is manually stopped, all functions cease, and when again manually started, all functions are resumed at the precise point of stoppage.

Another important object of this invention is to provide a time-control mechanism in combination with or as a part of the principal operating motor or means.

An important object also of this invention is to provide a machine of this class which requires no operative attention by the user, one that is highly efficient in performance, and one which is relatively simple and economical of construction and manufacture proportionate to its functions.

An important object of this invention is the provision of a tub which is so constructed and arranged that the water, or other liquid in the tub, is normally and effectively directed toward and upon dishes arranged in racks in the tub, and also toward or against the walls thereof, and is therefrom redirected toward and upon the back sides or portions of the dishes.

An important object also of this invention is to devise a novel impeller whereby water, or other liquid in the tub, is thrown in all directions, both vertically and horizontally, and which further is curved inwardly at the upper edge of its leading portion so that a portion of the liquid picked up by the impeller is directed upwardly while also thrown radially outwardly.

A novel feature in the embodiment of this invention is the provision of a novel hinge for the cover for easily adjusting the same to fit over the opening of the tub.

Another important object of this invention is to provide simple and effective means to prevent back-syphoning of the water, or liquid in the tub, to the water or liquid supply line.

An important object also of this invention is to provide a novel, effective, and efficient method of washing dishes, and the like.

With these and other objects in view, as will appear hereinafter, I have devised a dishwasher having certain novel features of construction, combination, and arrangement of parts and portions, as will be hereinafter described in detail, and particularly set forth in the appended claims, reference being had to the accompanying drawings and to the characters of reference thereon, which form a part of this application, in which:

Fig. 2 is an enlarged plan view of the machine, the cover of the machine being partly broken away to disclose the interior of the tub;

Fig. 3 is a cross-sectional view through one of the hinges for the cover, taken on line 3—3 of Fig. 2;

Fig. 4 is a longitudinal sectional view, taken on line 4—4 of Fig. 2, and showing the operating unit of the machine;

Fig. 5 is a sectional view of the water supply control means, taken on line 5—5 of Fig. 2;

Fig. 6 is a cross-sectional view of the operating unit, taken substantially on line 6—6 of Fig. 2, and showing the gearing for the timer mechanism in phantom;

Fig. 7 is a sectional plan view of the water discharge pump, taken on line 7—7 of Fig. 6;

Fig. 14 is a vertical sectional view, taken on line 14—14 of Fig. 13, and viewed in the direction of the arrows;

Fig. 15 is a similar view, taken on line 15—15 of Fig. 13, as observed in the direction of the arrows;

Fig. 16 is a fragmentary front view of the cover latching means, showing the relation of its parts prior to closing of the cover;

Fig. 17 is a view similar to Fig. 16, illustrating the relation of the latching components after the cover has been closed;

Fig. 18 is a plan view of the detergent holder;

Fig. 19 is a sectional view, taken on line 19—19, of Fig. 18, showing the holder in its position of rest, prior to the start of the washing operation;

Fig. 20 is a view similar to Fig. 19, illustrating the manner in which the holder is tilted to release the detergent therefrom under the force of the washing water which is directed upwardly thereagainst;

Fig. 21 is a view similar to Fig. 20, showing the detergent holder fully tilted;

Fig. 22 is a face view of the anti-siphon means located at the rear of the tub;

Fig. 23 is a sectional view, taken on line 23—23 of Fig. 22;

Fig. 24 is a diagram of the electrical circuit of the machine; and,

Fig. 25 is a chart illustrating the sequence and relative periods of operation of the various operating elements.

Figure 1:
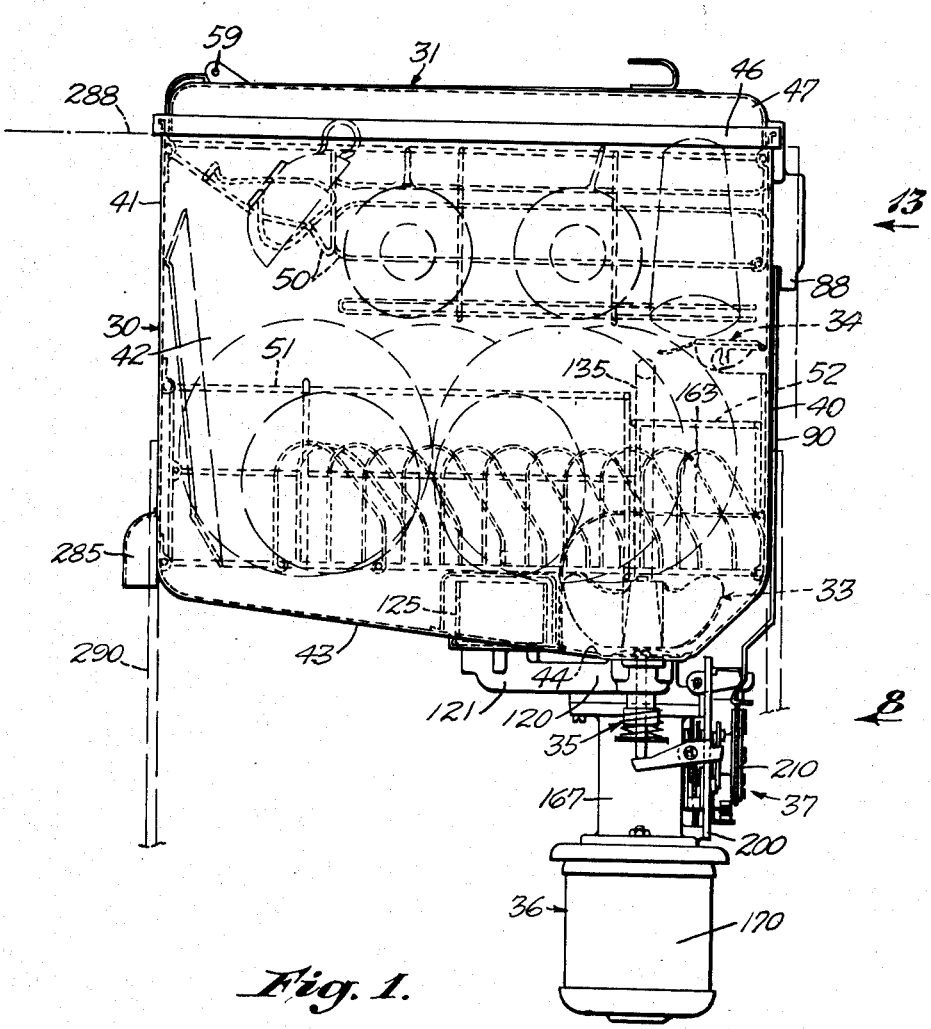
Fig. 1 is a side elevational view of the improved washing machine.

Referring to the drawings in detail, the present improved washing machine as herein disclosed is particularly adapted for use in washing dishes, silverware, utensils, and other articles used in the preparation and serving of a meal. In general, the washing machine comprises a tub 30 in which the articles to be washed are placed, the tub being provided with a hinged cover or lid 31 for closing the open top thereof, water supply means 32 for introducing predetermined amounts of water into the tub 30 at certain intervals during the complete rinsing and washing cycle of operations, a propelling means or impeller 33 for propelling water introduced into the tub upwardly and laterally throughout the interior of the tub to wash and rinse the articles, a detergent supplying device 34 for introducing into the washing water within the tub a selected amount of detergent at a predetermined instance in the washing cycle, drain means 35 for releasing the water from the tub at certain intervals during the rinsing and following the washing operations, a single driving means 36 for actuating all the operating mechanisms of the machine, and a control means 37 for effecting operation of the mechanisms in timed sequence. As will be hereinafter shown, the washing machine is entirely automatic in operation, it being only necessary to place the dishes and other articles in the tub and thereafter turn a control knob to set the various mechanisms for sequential operation, the machine being capable of pre-rinsing, washing, flood rinsing, and partially drying the articles in timed sequence.

The tub 30 is preferably fabricated from a suitable sheet metal and is substantially square in plan view, although it may be made from other materials and assume other shapes within the purview of this invention. As herein shown, the tub 30 has a front wall 40, a rear wall 41, side walls 42, and a bottom wall 43. The bottom wall 43 slopes downwardly toward a point adjacent the front wall 40 to provide a shallow well 44 which is substantially rectangular in plan view (Fig. 2). As shown in Fig. 3, the upper edges of the front, side, and rear walls of the tub 30 have outwardly directed flanges 45 which are received in a resilient bead 46 which extends around the upper rim of the tub. A square sheet metal frame 47 of angular cross-sectional shape has its vertical portion secured to the inner side of the bead 46 by screws 48 which also pass through the walls of the tub. By this construction, the frame 47 is securely attached to the tub to provide the upper end thereof, leakage between these parts being prevented by the resilient bead. As shown in Figs. 2, 3, and 14, the inner edge of the frame 47 is bent downwardly and inwardly to provide a substantially horizontal ledge or seat 49 extending completely around the tub opening.

Removably mounted within the tub 30 are upper and lower racks 50 and 51 which are adapted to support the dishes and other objects to be washed. In order to avoid obscuring important elements of the machine, the racks 50 and 51 are shown only in Fig. 1 of the drawings, although the inner outline of the racks is indicated by the dotted line in Fig. 2. The racks are preferably U-shaped in plan view so that the articles to be washed are arranged along the side and rear walls of the tub, the central portion of the tub thus being left unobstructed to permit the propelling of water against the dishes. The racks preferably are constructed from wire which is bent to provide a plurality of open article-holding receptacles, slots, etc., and a separate removable perforated container 52 may be employed for holding silverware, and the like.

The cover or lid 31 is also pressed from suitable sheet metal and is substantially inverted pan-shaped. The cover 31 is adapted to close down against the seat 49 of the tub frame 47. To provide a seal between the cover and the frame, a rubber or other resilient strip 55 is applied to the periphery of the cover. As shown in Figs. 3 and 14, the sealing strip 55 has a slot 56 for receiving the edges of the cover 31 and is made as a hollow extrusion so as to provide maximum resilience and adequate compressibility to insure a positive seal when the cover is closed. Adjacent its rearward edge, the cover 31 is provided with raised channel-like projections 58, between the side walls of which extend hinge-pins 59. The pins 59 also pass through the eyes 60 of hinge brackets 61, the lower ends of which are secured to the rear wall 41 of the tub by the screws 48 and the upper ends of which are disposed within the hollow projections 58.

Figure 13:
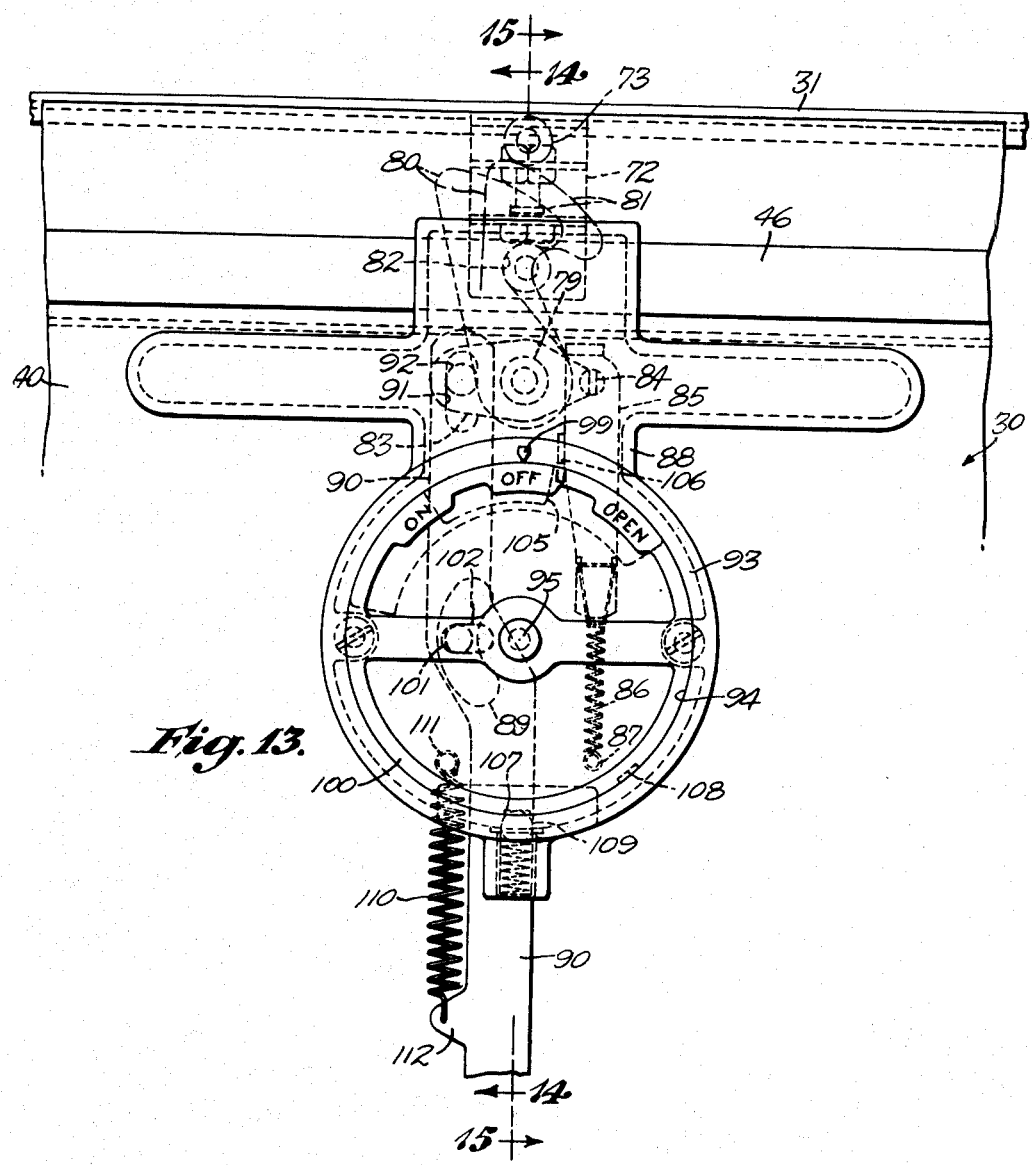
Fig. 13 is an enlarged front view of the manually operable means for initiating the operation of the machine and the latching means for retaining the cover in closed position during the operation of the machine, this view being taken in the direction of arrow 13 in Fig. 1.

Secured to the under side of the cover 31 is a channel 63 which strengthens the same, the side flanges of the rearward end of the channel being extended in ears 64 between which extends a pin 65. The pin 65 is engaged by the U-shaped end of a spring 66 which is coiled around a transversely extending spring retainer pin 67 carried by the ears 68 of a bracket 69 secured to the rear wall of the tub by the screws 48. As will be apparent by reference to Fig. 3, the spring tends normally to swing the cover 31 upwardly on the hinge-pins 59 to open position. A downwardly bent portion 70 of the bracket 69 serves as a stop to limit the action of the spring 66 to where it will automatically tilt the cover 31 to a position wherein it is disposed at an angle of approximately 45 degrees to the top of the tub 30, as clearly indicated by the dash lines in Fig. 3. However, the cover 31 can be manually tilted further, as shown by the dot-and-dash lines in this view. Referring now to Figs. 13 and 14, the cover 31 carries adjacent its forward free end a U-shaped bracket 72 which is welded or otherwise secured against the bottom surface thereof. The lower leg of the bracket 72 carries a latching roller 73. The lower leg of the bracket 72 is adjusted vertically toward and away from the cover 31 by means of a bolt 74 and nuts 75, so as to dispose the roller 73 at the distance from the cover which is necessary to effect proper co-operation of the roller with the cover latching means to be next described.

Rotatable in a bearing sleeve 78, secured within a hole in the front wall 40 of the tub 30 adjacent the upper edge thereof, is a stub shaft 79, to the inner end of which is secured a hook-like latch 80. The latch 80 has an upper curved edge or cam surface 81, and below this surface is a curved notch 82. A rocker 83 is carried by the stub shaft 79 outside the wall 40, and has a bent ear 84 at one end of which is suspended a detent bar 85 (Figs. 13 to 17). Connected to the lower end of the detent bar 85 is the upper end of a tension spring 86, the lower end of which is anchored to a pin 87 secured to the back of a hollow control panel 88 which is secured against the outer surface of the front wall 40. The spring 86 tends normally to pivot the rocker 83, shaft 79, and latch 80 in clockwise direction, as viewed in Figs. 13, 16, and 17, so that the latch assumes the position shown in dash lines in Fig. 13 and full lines in Fig. 16, a suitable stop means, to be later described, limiting movement in this direction. When the cover 31 is swung downwardly to close the tub, as shown in Fig. 14, its roller 73 engages the curved edge 81 and cams the latch counterclockwise to a position which allows the roller to pass the end of the hook so that when the roller registers with the notch 82 the latch snaps toward the right to retain the cover in closed position, as shown by dotted lines in Fig. 13 and full lines in Fig. 17.

A combined manual and automatic means is provided for releasing the cover 31 to allow it to spring open under the action of the spring 66. This means includes a cover actuating bar 90 which is slidable vertically through the hollow control panel 88. The upper end of the bar 90 has a slot 91 for receiving a pin 92 on the rocker 83. The control panel 88 has a circular flange 93 defining a recess 94 in which is rotatable, on a boss 95 of the panel (Fig. 14), a control knob 100 which has circumferentially spaced designations "On," "Off," and "Open" adapted to register with an index mark 99 on the control panel (Fig. 13). The knob 100 carries an actuating pin 101 which passes through a horizontally extending elongated opening 102 in the vertical bar 90. The panel 88 has an arcuate opening 89 through which the pin 101 extends. It is thus seen, by reference to Fig. 13, that when the knob 100 is rotated counterclockwise from the position shown therein, its pin 101, acting in the opening 102, slides the bar 90 downwardly and, due to the connection of the bar with the rocker 83, the latter is rotated in counterclockwise direction to cause the latch 80 to release the roller 73 and thus permit the cover to spring open.

Through instrumentalities, to be later described, when the knob 100 is turned clockwise from the position shown in Fig. 13 to a position where its mark "On" registers with the index 99, operation of the driving means 36 is initiated. It is extremely important that means be provided for preventing energization of the power drive means when the cover 31 is open, at least during the major portion of the washing cycle. For this purpose, the control knob 100 is provided with a curved stop lug 105 on its rearward or inner side and the detent bar 85 has a bent ear 106. When the cover 31 is in open position and the detent bar 85 thus is in lower position, the ear 106 is disposed in the path of arcuate movement of the lug 105 (Fig. 16) so that clockwise rotation of the control knob to "on" position is prevented. However, as the cover 31 is closed, the ear 106 is accordingly raised so that the lug 105 can pass thereunder to permit such rotation of the control knob (Fig. 17). The knob 100 has circumferentially spaced recesses 107 and 108 in its lower portion adapted to receive a spring-pressed ball 109 in the panel 88. By this detent means, the knob 100 is releasably held in either "off" or "on" positions. During a washing operation, the actuating bar 90 assumes the position shown in Fig. 17 with the lower end of its opening 91 engaging the pin 92 of the rocker 83, the bar being retained in this position by a tension spring 110 having its ends connected respectively to a pin 111 on the control panel 88 and an ear 112 on the bar. By this means, pivotal movement of the latch 80 to cover releasing position is resisted by the combined action of the detent ball 109 and the springs 86 and 110.

Secured against the bottom surface of the tub 30 is a T-shaped casting or housing 120, which has a main portion underlying the shallow well 44 and a tubular branch portion 121 extending toward the rearward wall of the tub 30. The branch portion 121 has an open end which registers with an opening 122 in the bottom wall 43 of the tub and which is fastened in place by screws 123, a gasket 124 being interposed between the tub and the end of the portion 121 to prevent leakage of water therebetween. Also fastened in place upon the upper surface of the bottom wall 43 is a cup-shaped overflow element 125 having a hole aligned with the opening 122. During certain periods in the operative cycle of the machine, a quantity of water is introduced into the tub and thrown against the articles being washed. During these portions of the cycle, the level of the water is maintained at substantially the height shown in Fig. 4. However, if for any reason the water should rise to a point above this level, it will flow down through the overflow element 125 and be discharged into the drainpipe of the building in which the machine is in use. A baffle 126 overlies the open upper end of the overflow element 125 and serves to prevent the loss of water that would occur over the overflow element 125 if left open to the water spray.

Water is introduced into the tub 30 by the means to be next described. The right-hand end of the main portion of the housing 120, as viewed in Fig. 6, is provided with a vertical hole for receiving the upper end 129 of a valve body 130. This upper end is screw threaded and passes upwardly through aligned holes in the well 44 and a reinforcing plate 131, a gasket 132 being disposed between the housing 120 and the bottom of the tub 30. A nut 133 screwed onto the upper threaded end retains the valve body 130 in place. A water supply tube 135 has its lower end disposed in the end 129 of the valve body 130 and a tapered, resilient sleeve 134 is compressed around this end of the tube to retain the latter in place and to seal the joint (Fig. 5). The upper end 136 of the tube 135 is bent laterally and downwardly (Fig. 6) in a crook so that water flowing upwardly through the tube 135 is reversed, that is, directed downwardly toward the bottom of the tub 30. As shown in Fig. 5, the valve body 130 has a vertical, axial bore for receiving the lower end of the water supply tube 135 and has an insert or ring 137 therein through which the water can flow upwardly. The water enters the valve body by way of a lateral passage 138, into which the water flows from a flexible hose 139 (Fig. 6). The hose 139 is connected to the valve body by a nipple 140, the other end of the hose having suitable coupling means (not shown) by which the hose can be joined to the faucet of a water main. The rate of flow of water into the valve body 130 may be regulated by means of a rotary valve stem 141, in accordance with the water pressure in the line which supplies water to the washing machine.

In accordance with the present invention, water is supplied to the tub 30 during certain intervals during the complete washing and rinsing cycle, and it is desirable that the flow of water be promptly started and stopped. For this purpose, the water supply valve 32 is provided with a valve stem 144 having a tapered head 145 at its upper end adapted to seat in the opening of the ring 137 to disrupt the flow of water into the tub. The valve stem 144 is slidable in a bushing screwed into the lower end of the valve body 130, and a compression spring 146 is employed for urging the stem upwardly to close the valve. A sealing means 147 prevents leakage of water from the valve around the stem 144. The lower end of the valve stem 144 projects downwardly and has a bifurcated end 148 which is joined to one end of a valve-actuating lever 150. The lever 150 is pivoted at 151 to a bracket 152 attached to a side of the valve body 130 and has a second end which is pivotally connected to the armature or pole-piece 154 of a solenoid 155 which is also attached to the side of the valve body. The valve stem 144 normally is maintained in position to close the ring 137 by the spring 146, and when it is necessary to admit water into the tub 30 the solenoid 155 is energized automatically to draw the valve stem downwardly, as shown in Fig. 5, to open the valve. The means for energizing the solenoid will be described later.

Upon entering the tub 30, the hot water is directed downwardly by the bent upper end 136 of the supply tube 135, the bent end thus serving as a nozzle and causing the water to impinge against the rotary propeller 33. The propeller 33 has at least two curved blades 160 which, as shown in Figs. 2, 4, and 6, have inclined intermediate portions. The blades 160 thus provide, in effect, a pair of scoops which are capable of scooping up water present in the tub and throwing it upwardly and laterally, the water thus violently contacting all four sides of the tub and being broken up in drops which bounce inwardly against the rear sides of the dishes arranged in the racks. In this manner, the water is caused to impinge against all surfaces of the articles being washed with the result that they are thoroughly washed and rinsed. During the initial portion of the cycle, the dishes are pre-rinsed, that is, subjected to a spray of clear water to soften and dislodge foreign matter which may be present thereon. During this initial operation water is not permitted to remain in the tub, since obviously the spraying water cannot be reused because the removed matter would be redeposited on the dishes. During the prerinsing of the articles, the supply of water is directed down against the propeller 33 which acts to propel the clear water onto the articles. The propeller 33 may be made in two complementary halves having central portions adapted to be clamped around the upper end of a propeller shaft 161 by means of small bolts 162. A coarse wire guard 163 is superimposed over the propeller 33 and has a fine mesh screen 164 at its lower portion designed to prevent foreign matter washed from the dishes from contacting the propeller and thus being thrown back onto the same.

The upper end of the propeller shaft 161 referred to above is rotatable in a bearing sleeve 165 held in an annular element held in a relatively large opening in the bottom wall of the tub (Fig. 4). The lower end of the shaft 161 is rotatable in a bearing boss 166 of a substantially tubular casing 167 bolted to the lower surface of the housing 120. The driving means 36, previously mentioned, consists of an electric motor 170 whose casing is bolted to the lower end of the casing 167. The motor 170 has a drive shaft 171 which is connected to the lower end of the propeller shaft 161 by a coupling 172. Thus, when the electric motor is energized, the propeller 33 is rotated at the same high speed as the motor. In the present machine, a motor having an R. P. M. of approximately 1750 is found to be satisfactory. The lower side of the housing 120 is provided with a circular recess 174, the lower side of which is closed by the casing 167. The recess 174 constitutes a pump chamber in which an impeller or runner 175 is rotatable, the runner being carried by and rotatable with the propeller shaft 161 (Fig. 6). Disposed above, and in fluid communication with the pump chamber 174, is an orifice 176 through which water overflowing from the tub 30 and flowing through the tubular branch 121 can enter the chamber to be pumped through a lateral discharge passage 177 into a drain hose 178 (Fig. 7) which may direct the water into a sink or into a service drainpipe.

Referring now to Figs. 2 and 6, the housing 120 is also provided with a passage 180 which extends to an end of the main portion thereof and communicates with the orifice 176. This end of the housing has an annular flange which seats against the lower side of a resilient sealing ring 181 disposed in aligned holes in the bottom wall of the tub and in the reinforcing plate 131. The upper rim of the ring 181 provides an annular seat 182 against which a drain valve disc 183 is adapted to seat. The disc 183 is resiliently mounted at the upper end of a stem or spindle 184 by means of resilient O-rings 185 between which the disc is disposed. The spindle 184 is slidable vertically in a bearing sleeve 186 carried by the housing 120, the slide joint being sealed by a packing 187. The lower end of the spindle 184 projects downwardly from the bearing sleeve and carries a small plate or disc 188 between which and the lower surface of the housing 120 is disposed a compression spring 189. The spring 189 normally urges the valve stem 184 downwardly to maintain the valve disc 183 seated against the annular seat 182 so as to retain water in the tub 30. However, the machine is provided with cam-actuated means, to be later described, for sliding the valve stem upwardly at certain intervals during the operational cycle, so as to unseat the disc 183 and permit the water to drain from the tub 30 through the passage 180 and orifice into the pump chamber 174 so as to be pumped by the impeller 175 through the discharge hose 178 into the drainpipe.

The control and operating means 37 for operating the various mechanisms thus far described is constructed and arranged as next described. Referring particularly to Figs. 1, 4, 6, 8, and 9, the control means 37 is driven by the electric motor 170. As shown best in Figs. 4 and 6, the propeller shaft 161 carries a helical gear 192 which meshes with and drives a similar gear 193 fast on a transverse power take-off shaft 194 rotatable in a bearing boss 195 within the casing 167. The shaft 194 projects from the casing 167 and has a small pinion 196 formed thereon. Secured to the side of the casing 167 by screws 199 is a control plate 200, and fastened to the rearward side of the plate is a pair of spaced plates 201 and 202 which are suitably retained in spaced relationship. The plates 201 and 202 together provide a holder for rotatably supporting a series of power transmission gears 203, 204, 205, 206, 207, and 208 (Fig. 6). The gear 203 meshes with and is driven by the pinion 196, and the other gears of the train progressively drive succeeding gears in the order named above so as to rotate the small gear 208 at a greatly reduced rate of speed.

Figure 8:
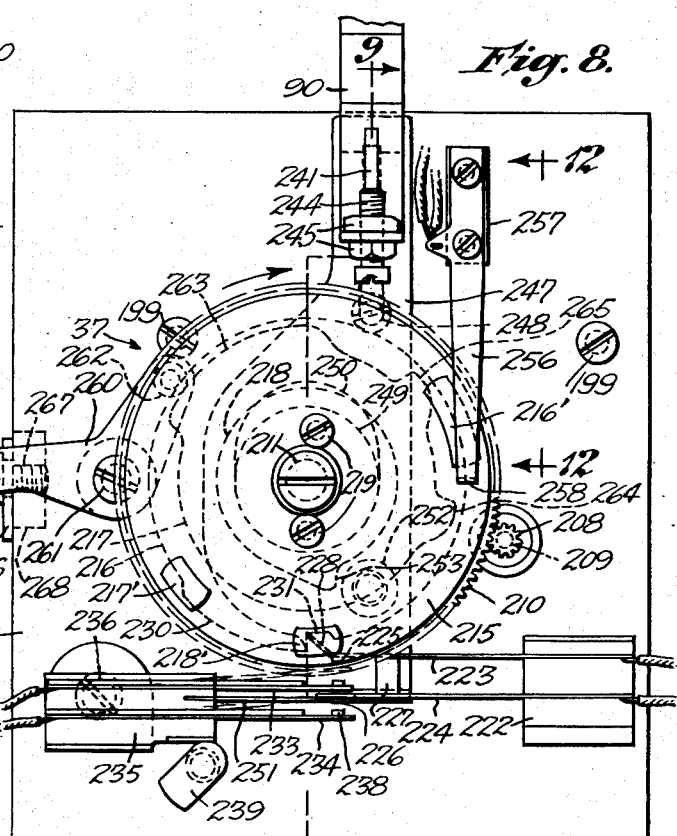
Fig. 8 is an enlarged front elevational view of the control device, as viewed in the direction of the arrow 8 in Fig. 1.
Figure 9:
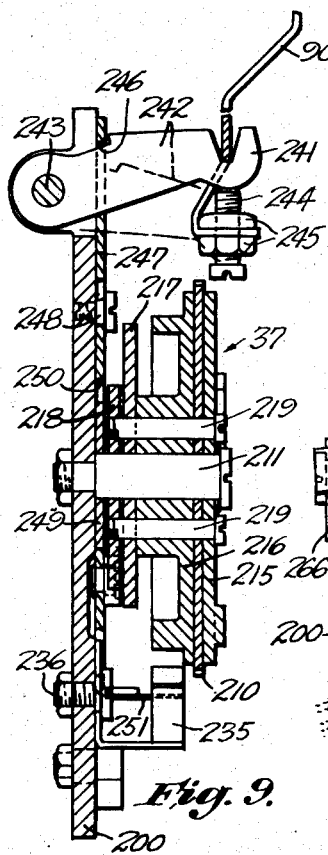
Fig. 9 is a cross-sectional view, taken substantially on line 9—9 of Fig. 8.

As shown in Figs. 8 and 9, the gear 208 is carried by a shaft 209 which extends through the control plate 200, the gear meshing with a larger gear 210 which is rotatable on a stud 211 fastened to and projecting forwardly from the plate 200. In accordance with the speed reduction gearing 192, 193, 194, 196, 203 to 208, and 210, the latter gear is driven from the electric motor 170 at a greatly reduced speed. In the present machine, the gears provide a speed reduction ratio of 17,500 to 1, so that during 1750 revolutions of the motor shaft 171, per one minute, the gear 210 is rotated through one-tenth of a revolution. By this gear arrangement, therefore, the gear 210 is rotated through one complete revolution in ten minutes. It is well to mention at this point that it is within the concept of this invention to drive the control mechanism from a synchronous clock mechanism. However, since the control means must rotate the various cams which, in turn, actuate the various mechanisms, a positive drive from the electric motor 170 is preferable, if not entirely necessary.

Abutting the outer or forward face of the control gear 210 is a disc-like water supply cam 215, and rotatable on the stud 211 rearwardly of the gear is a main switch cam 216, a water drain cam 217, and a cover releasing cam 218, the gear 210 and several cams being connected by screws 219 to provide a control cam unit which is rotatable on the fixed stud.

Figure 10:
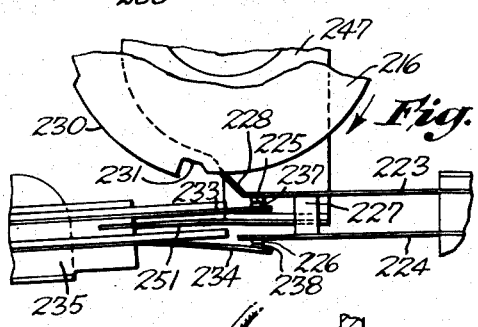
Fig. 10 is a fragmentary front view of the main switch for the electrical circuit of the machine, showing the switch closed.
Figure 11:
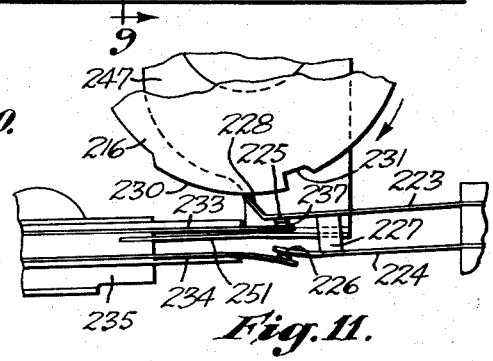
Fig. 11 is a view similar to Fig. 10, showing the switch locked in a closed position to prevent manual opening thereof.

Attached to the front face of the control plate 200 is an insulated block 222 which carries a pair of laterally extending, vertically spaced, spring contact arms 223 and 224 having contact buttons 225 and 226 at their respective inner ends, the arms being maintained in spaced relation to each other by a spacer 227 of insulation material, which may be secured to the arm 224. The upper contact arm 223 has an inclined end 228 which serves as a cam follower and which engages the periphery of the main switch cam 216, due to the inherent resiliency of the contact arms. As shown in Figs. 8, 10, and 11, the cam 216 has a circular peripheral edge throughout the major portion of its circumference, but is provided with a raised lobe 230 extending through approximately 48 degrees and a depression 231 between the lobe 230 and the leading end of the main circular edge, the depression extending through approximately 10 degrees.

A second pair of vertically spaced, spring contact arms 233 and 234 are carried by an actuating element 235 which is pivoted on a stud 236 attached to the control plate 200, the arms having respective contact buttons 237 and 238. The contact arms 223, 224, 233, and 234, are connected in an electrical circuit, shown in Fig. 24, for supplying current to the electric motor 170. When the contacts 225, 237, and 226, 238, are closed at the start of the washing cycle, the electric motor is energized to drive all the mechanisms in timed sequence. To effect closing and opening of the electric circuit, the various contact arms are moved toward and away from each other either manually or automatically by the means to be presently described. When the contact arms are moved to circuit opening position they assume the relative positions shown in full lines in Fig. 8, and to initially adjust the movable contact arms 233 and 234 a pivoted stop finger 239 is provided.

The lower end of the actuating bar 90, previously described, is slotted to receive the forwardly extending hooked end 241 of a lever 242 which is pivoted at 243 to the control plate 200 (Fig. 9). The bar 90 is held connected to the lever 242 by means of a screw 244 and nuts 245. The lever 242 extends through a vertical opening 246 of a slide plate 247 which is slidable vertically against the forward face of the control plate 200. The slide plate 247 is guided by a screw-and-slot means 248 and through the medium of a disc 249 on the stud 211 which is disposed in an elongated opening 250 in the slide plate (Fig. 8). It will be apparent by reference to Figs. 1, 4, 8, and 13, that when the control knob 100 is rotated clockwise to "on" position, its pin 101, acting in the opening 102, slides the bar 90 upwardly, to thereby tilt the lever 242 and raise the slide plate 247. The slide plate 247 carries a leaf spring 251 which engages in a slit in the actuating element 235 so that when the slide plate is raised, as above explained, the element is rocked in counterclockwise direction to cause its contacts 237 and 238 to engage the contacts 225 and 226 to close the circuit to the motor 170, thus initiating the operation of the machine. As previously explained, unless the cover 31 has been closed it is impossible to rotate the knob 100 to "on" position so that raising of the slide plate 247 and tilting of the contact arms 233 and 234 to switch-closing position is prevented. In other words, it is impossible to energize the operating motor 170 unless the cover 31 is first closed.

After the machine has operated through the major portion of its cycle and the subjection of the articles to the spray of hot water has been completed, the cover 31 is released or unlatched automatically to allow it to spring open to the position indicated by the dash lines in Fig. 3. While the cover is in this open position, rotation of the propeller 33 is continued and, since at this time no water is present in the tub 30, the propeller serves as a fan to force steam upwardly from the tub and to circulate warm air around the articles to dry the same. The automatic means for effecting release of the cover 31 consists of a roller 252 mounted on the slide plate 247 and engageable with the periphery of the cover release cam 218 which is provided with a single lobe 253. As the control cam assembly approaches the end of its single rotation, the lobe 253 depresses the roller 252, slide plate 247, lever 242, and bar 90, which then acts to rotate the knob 100 to "off" position and to rock the latch 80 in counterclockwise direction to release the roller 73 so as to permit the cover to spring open. Even though the knob is turned to "off" position and the slide plate 247 and contacts 233 and 234 are lowered, the electric circuit to the motor is prevented from opening by the fact that the contact arms 223 and 224 are simultaneously lowered to remain in engagement with the contacts 233 and 234, and this result is brought about by the engagement of the follower end 228 of the contact 223 with the cam lobe 230 of the cam 216 as the roller 252 is moved downwardly by the cam lobe 253. At the completion of the single rotation of the cam assembly the roller 252 rides off the cam lobe 253, and this permits the slide plate 247 and bar 90 to move upwardly under the influence of the spring 110, thereby drawing the contacts 233 and 234 upwardly. At this juncture the follower end 228 snaps into the depression 231 of the cam 216 so that all the contacts are spaced apart to open the circuit to the motor 170. It is to be noted at this point that when the machine is thus stopped, the roller 252 does not move upwardly to the uppermost extent of its permissible movement, due to the engagement of the detent ball 109 in the recess 107. However, when the machine is again started, by rotating the knob 100, the slide plate 247 is raised higher to engage the contacts to close the circuit to the motor.

Figure 12:
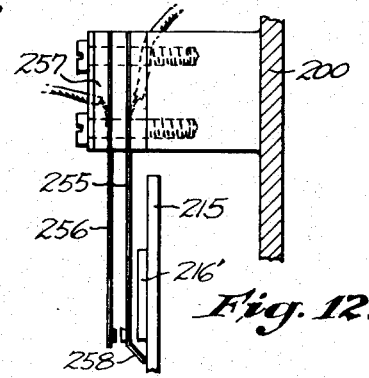
Fig. 12 is a cross-sectional view of the switch for controlling the actuation of the supply valve solenoid, taken on line 12—12 of Fig. 8.

Also connected in the electrical circuit is a pair of spring contact arms 255 and 256, these arms being carried by an insulating block 257 mounted on the control plate 200 (Figs. 8 and 12). One arm 255 has a bent end 258 providing a follower which rests against the forward face of the water supply cam 215. When the cam 215 rotates in clockwise direction, the follower 258 engages successively with the cam lobes 216', 217', and 218', and at each engagement the contact arm 255 is thus moved into contact with the arm 256 to close the circuit to the water supply valve solenoid 155, thus energizing the same to open the valve 144 so as to admit hot water into the tub 30 through the tube 135. The cam lobes 216', 217', and 218', are of such arcuate length and so spaced circumferentially that they provide the tub with sufficient water to perform the intended and necessary pre-rinse, washing, and two flood rinsing operations during the complete cycle of operations.

Referring to Figs. 4 and 8, the means for operating the drain valve 183 includes an angular arm 260 which is pivoted on a stud 261 secured to the control plate 200. The arm 260 is provided at one end with a cam follower roller 262 which engages the periphery of the drain valve cam 217 which has three cam lobes 263, 264, and 265. The other end of the arm 260 overlies the forward end of a lever 266 which is pivoted at 267 to a rearwardly projecting box 268 of the control plate 200. The rearward end of the lever 266 underlies the lower end of the drain valve stem or spindle 184. When the roller 262 rolls up onto each of the cam lobes 263, 264, and 265, the arm 260 is pivoted in counterclockwise direction so that it pivots the lever 266 to raise its rearward end. By this action the valve stem 184 is slid upwardly against the action of the spring 189 to open the drain valve. When the follower roller 262 rides off from a lobe, the spring 189 causes the drain valve to close, it being noted that the spring, acting through the lever 266, maintains the roller in engagement with the cam 217.

It is well known that in washing dishes and other tableware it is necessary to use a cleansing agent, such as soap or washing powder, in order to dissolve and remove solid matter, grease, etc., therefrom. In washing tableware in the present machine, the use of a detergent powder, during the washing cycle, is recommended. As has been previously indicated, the machine is designed to perform the various washing and rinsing operations only when the cover or lid is closed, and while it is possible to stop the operation and open the lid at any time during the major portion of the operative cycle, this is undesirable for the reason that the hot vapors of the hot water being used should remain in the tub. It is therefore apparent that unless the detergent is placed in the tub before the machine is started it is necessary to open the lid to supply the detergent to the tub. If the initial step in the cycle of operations was that of washing the tableware by the use of hot water containing the detergent, the problem of supplying the detergent would be a simple one since the powder would then be poured directly into the tub before the lid was closed. However, it has been found highly desirable to prerinse the tableware by subjecting the same to an initial spray of clear, hot water, and this is the first step performed by the present improved washing machine. It is obvious, therefore, that means must be provided for supplying the detergent after the prerinsing operation, without opening the lid to accomplish this act. This novel and ingenius means is constructed and arranged as next described.

The detergent supplying means consists of a cup-like container 270 which is shown in detail in Figs. 18 to 21. The container 270 is preferably rectangular in plan view and has vertical side walls 271, a steeply inclined rear wall 272, and an arcuate wall 273 which provides the bottom and front wall. The container 270 is made from light-weight material, such as thin stainless steel, and is provided with a light-weight lid 275 which is hinged to the forward end of the container, as shown at 276. The lid 275 has a rearwardly projecting stop finger or tab 277 which is provided for the purpose to be later explained. The container 270 is provided with pivot pins 279 carried by its side walls 271 at a point disposed rearwardly of the center of pivotal balance. The other ends of the pivot pins 279 are adapted to be received in vertical slots 280 formed in the parallel arms or wings 281 of a U-shaped bracket 282. The bracket 282 is fastened against the inner surface of the front wall 40 of the tub 30 at a location which is approximately midway between the top and bottom of the tub, as shown in Fig. 1.

It is apparent from the foregoing that the detergent holder 270 is readily removable from the tub, and when so removed it can be employed in the manner of a scoop in filling it with detergent powder contained in the usual package. After the container 270 has been filled with the detergent powder, it is placed in a horizontal position in the tub 30 by merely inserting its pins 279 into the slots 280. The container then assumes the position illustrated in Figs. 2, 18, and 19, with its hinge end resting against the bracket 282. It is to be noted that the volume and weight of the filled container 270 forwardly of the pivot pins 279 is slightly greater than the volume and weight of the rearward portion so that the container tends to remain in the position referred to above.

During the initial operation of the machine, that is, the prerinsing operation, hot water is introduced into the tub through the supply nozzle 136 and is directed downwardly against the rapidly rotating propeller 33, which propels the water upwardly and laterally against the tableware to remove loose waste material therefrom. During this first step in the cycle the drain valve 183 remains open, so that the rinsing water, after contacting the tableware, drains out from the tub 30, carrying with it the waste matter removed from the tableware. Some of the water sprayed by the impeller during this prerinsing operation of course strikes the bottom of the detergent container 270, but the force applied by this relatively thin spray is insufficient to disturb the setting of the container. However, following the prerinsing operation, the drain valve 183 is closed and the tub 30 is then charged with a supply of hot water which builds up therein, as indicated by the water level indicated in Fig. 4, and during this charging of the tub the propeller 33 continues to rotate so that the water is scooped up by the revolving blades 160 and thrown thereby, the increase in displacement and force of the propelled water being proportional to the increase in volume of the water being supplied to the tub. At a certain stage of the charging operation, the upward force of the propelled water, which impinges against the under surface of the detergent container 270, causes the latter to tilt rearwardly, as shown in Fig. 20. This action is due to the fact that the forward portion of the container provides, in effect, a greater fluid pressure area than that portion which is disposed rearwardly of the pivot of the container. As the container 270 is thus tilted, the detergent powder is discharged into the tub 30 to mix with the hot water therein. In order to prevent the container from rotating completely around, which might result in displacement of the container from its supporting bracket, the tab 277 is employed, the tab being adapted to engage against the forward wall 40 of the tub to prevent such rotation and to retain the container in substantially the position shown in Fig. 21.

As will be apparent, if at any time during operation there should occur a combination of the supply valve failing in its timed closing and the discharge pump failing in its operation, the water level in the tub would rise above the delivery orifice of the supply tube 135; and if then a vacuum should be drawn in the public water supply system, dishwater would be drawn or syphoned back into the public water supply. To avoid this condition an anti-syphon overflow is provided. As shown in Figs. 1, 22, and 23, this consists of an opening 286 in the rear wall 41 of the tub, this opening being located approximately midway between the normal operating water level and the input orifice of the supply tube 135, and its area being sufficient to pass any and all water entering the tub through the supply, and thus preventing the excess water level from reaching the supply tube orifice where it might be drawn back into the house supply system under conditions described above. Attached to the inside of the tub is a shield 285 which prevents any flow of water through the opening 286 during normal operation of the machine. Hingedly mounted in the shield 285 is the gravity operated closure element 287 which, during operation, is normally closed for the purpose of preventing the escape of steam, but which opens automatically when the excess water level reaches the aforesaid overflow point, thus permitting discharge of the excess water through the opening 286.

The present washing machine may be installed within the counter of a kitchen cabinet alongside a sink, such a counter being indicated generally by the dash lines 288 in Fig. 1. In addition the machine may be constructed as a mobile unit, in which case the tub is mounted on a frame 290 having casters so that the machine can be readily moved to a point adjacent a sink to perform a washing operation, and subsequently stored in any convenient location.

The washing machine having been described in detail, and the operation of the various mechanisms explained, the complete operative cycle will next be briefly outlined. To prepare the machine for operation, the soiled dishes, plates, cups, silverware, and other tableware, are stacked in the racks 50 and 51 and placed in the container 52, the readily removable waste matter having been previously scraped from the articles. When the mobile type of machine is used, it is first moved to a location adjacent the sink and the water supply hose 139 is connected to a mixing faucet, which is then opened, and the drain hose is hooked over the edge of the sink. The detergent container 270 is then filled with detergent powder and placed in the machine, after which the cover 31 is closed down against the top of the tub 30 to close the same. The electric cord 291 of the electric circuit is, of course, plugged into a service outlet. The machine is then ready for operation. When the machine is at rest, that is, before the washing cycle is started, the parts of the various mechanisms assume the positions to be next outlined. The supply valve stem 144 is at this time in a closed position, the drain valve 183 in raised or open position, the filled detergent container 270 assuming the position shown in Figs. 1 and 19, and, since the motor 170 is inoperative, the propeller 33 and the pump runner 175 are inactive.

To start the operation of the machine, the control knob 100 is rotated clockwise from the "off" position to the "on" position where it is releasably retained by the engagement of the detent ball 109 in the recess 108. Rotation of the knob 100 in this manner is permitted since at this time the stop ear 106 is disposed upwardly out of the path of the lug 105 due to the cover latch 80 being in the latching position shown by the dotted lines in Fig. 13. During the rotation of the knob to "on" position, the pin 101 thereof coacts with the opening 102 of the bar 90 to raise the latter and the slide plate 247. Through means of the leaf spring 251, the switch element 235 is tilted upwardly to cause the contacts 233 and 234 to engage the respective contacts 223 and 224 so as to close the circuit to the motor 170 to energize the same and thus cause the propeller 33 and pump runner 175 to rotate at the same rotative speed as the motor shaft. At the same time, the motor 170 starts to drive the cam cluster 215, 216, 217, and 218, at a greatly reduced rate of speed, in the embodiment of the invention disclosed herein, the speed reduction produced through the gear train 192, 193, 194, 196, 203 to 208, causing the various cams to rotate in unison at a speed of one-tenth revolution per minute, or one complete revolution in ten minutes, this single rotation completing the entire washing and rinsing cycle.

Referring to the "sequence of operations" chart shown in Fig. 25, it will be seen that for a short period after the motor 170 is started the water supply valve remains closed and the drain valve remains open. This "lag" permits the motor 170 to attain full speed. At the end of this lag period the contacts 255 and 256 are closed by the cam lobe 216' of the water supply cam 215 so as to complete the circuit through the solenoid 155 and energize the same to open the valve 144. Thus, hot water is admitted through the tube 135 and directed downwardly against the rotating propeller 33 by the nozzle 136. The hot water is immediately propelled upwardly and laterally by the propeller, the drops of water splashing against and bouncing from the sides of the tub to contact not only those surfaces of the articles which face the propeller but to also contact the opposite sides, in fact, all the surfaces of the articles, so as to completely rinse the same with clear, hot water. This operation is termed a "prerinse" since it precedes the actual washing operation. Referring to the chart, Fig. 25, it will be seen that during this prerinse the drain valve 35 remains open so that the water, which is directed against the articles, drains from the tub carrying with it particles of food removed from the articles, the pump 175 effectively maintaining the tub 30 empty.

At the end of the prerinse operation, the roller 262 rides off from the cam lobe 263 so that the drain valve stem 184 is actuated by its spring 189 to seat the valve disc 183, thus shutting off the drain. However, the water supply valve remains open (see Fig. 25) so that water, which continues to be introduced into the tub through the supply tube 135, is retained therein and rises, the propeller 33 continuing to propel this hot, clear water throughout the inside of the tub. As the volume of water increases in the tub, the force of the spray is proportionately increased so that eventually a force of sufficient magnitude is applied against the detergent container to upset the same so as to cause the detergent powder to spill out therefrom and mix with the water, thus providing an effective cleansing solution. The tub 20 continues to be charged with water until the lobe 216' of the cam 215 rides out from under the follower of the contact 255, at which time the solenoid 155 is deenergized and the water supply valve 32 thus closed by the spring 146 to shut off the flow of water into the tub. This washing operation continues for a considerable period of time, the washing solution being continually sprayed against the tableware, and the supply and drain valves remaining closed, as shown in Fig. 25. Eventually, the water supply valve reopens, but prior to this opening the drain valve is opened, through the action of the cam lobe 264, so that the washing solution is drained from the tub upon the completion of the washing operation.

At the end of this draining operation the cam lobe 264 of the drain valve cam rides out from the roller 262 of the arm 260, and thus the valve stem 184 and disc 183 are permitted to descend to close the drain valve. Just prior to this action the lobe 217' moves under the end 258 of the spring contact 255 to cause it to engage the contact arm 256 so as to close the circuit to the solenoid 155 and open the water supply valve 144 to admit clear hot water into the tub 30. Thus, the tub is charged with a fresh supply of water for the purpose of performing a "flood rinse," this operation being similar to the washing operation except that no detergent is used. After charging for this flood rinse, the cam lobe 217' rides out from the contact 255 so that the water supply valve 144 is closed to prevent over-supply of the water, which would cause the water to flow from the tub through the overflow 125, 121. As shown in Fig. 25, the drain valve remains closed during this flood rinsing operation.

At the completion of this portion of the cycle the cam lobe 265 actuates the roller 262 so that the drain valve 183 is again opened to permit draining of the water from the tub, so as to carry away waste particles in suspension in addition to particles of the detergent previously used in the washing operation. The water supply valve 144 remains closed until just prior to the end of the draining operation, at which time the lobe 218' of the cam 215 engages with and flexes the contact arm 255 against the arm 256 to again close the circuit to the solenoid 155 and thus open the water supply valve 144 to admit a third supply of water into the tub to charge the same for a second flood rinsing operation (Fig. 25).

At the end of the tub-charging operation, the lobe 218' releases the contact arm 255 so that the solenoid is deenergized and the water supply valve is closed. The propeller 33 then acts to scoop up and propel the water from the tub against the articles so as to further flood rinse the same with the clear hot water. As shown in the sequence of operations chart, the water supply valve 144 remains closed during the remainder of the cycle. On the other hand, at the end of the second flood rinsing operation, the long cam lobe 263 engages the roller 262 so that the drain valve 183 is opened, and remains in this position during the remainder of the cycle. Thus, all the water is discharged from the tub 30 by the pump.

During the major portion of the operative cycle outlined above, the inclined end 228 of the contact arm 223 is engaged by the periphery of the cam 216, so that the contact arms 223 and 224 assume the position shown in Fig. 10. It is thus seen that by turning the control knob 100 counterclockwise from "on" position to "off" position, the bar 90 and slide plate 247 are slid downwardly, and through the leaf spring 251 the element 235 and contacts 233 and 234 are lowered away from the contacts 223 and 224 to open the electrical circuit to deenergize the motor 170 and thus stop the entire machine. It is apparent, therefore, that the attendant may at any time discontinue the operation. However, when the control knob 100 is again turned to "on" position, the machine will start at that portion of the cycle where it was stopped and continue until the disrupted cycle is completed. In addition to shutting off the machine manually, as explained above, the attendant may continue the counterclockwise rotation of the control knob 100 to "open" position, and during this movement the bar 90 and slide plate 247 are depressed to a further extent, but since the contact holder element 235 cannot pivot further downwardly the leaf spring 251 merely flexes. Such rotation of the knob also causes the bar 90 to pivot the rocker 83 and latch 80 in counterclockwise direction so as to release the cover 31, which then springs open. Consequently, if the attendant wishes to stop the machine and open the cover for the purpose of inserting additional tableware, or to remove some article, this is readily accomplished by merely turning the knob 100 to "open" position, attention being directed to the fact that during this operation rotation of the propeller is arrested before the cover is opened, so that the danger of hot water being thrown upwardly out of the tub when the cover is opened is entirely avoided.

After the machine has operated through approximately seven-eighths of its complete cycle, that is, at approximately that point in the cycle which is designated at X in Fig. 25, the lobe 230 of the cam 216 engages the end 228 of the contact arm 223 to depress and maintain both contacts 223 and 224 in positive engagement with the contact arms 233 and 234 so as to cause the electrical circuit to remain closed even though the control knob 100 is inadvertently turned to "off" or "open" positions. Since the supply of water is shut off and no water remains in the tub 30, opening of the cover 31 by turning the knob 100 to "open" position can cause no damage to the machine or injury to the attendant. Locking of the contacts in closed relation in the manner explained above insures that the machine will complete its full cycle before coming to rest, and the control means will thus be reset for a subsequent washing operation.

Following the locking of the contacts as outlined above, the single lobe 253 of the cover-release cam 218 rotates to a point where it engages and depresses the roller 252 of the slide plate 247 to move the latter downwardly. The contact holder element 235 is thereby pivoted downwardly against its stop-finger 239, but the contacts 233 and 234 are not then separated from contacts 223 and 224, inasmuch as the latter have been previously moved downwardly by the cam lobe 230 so as to maintain contact as described above. Lowering of the slide plate 247 and the bar 90 connected thereto causes the elongated opening 102 of the bar to pull the pin 101 downwardly so as to rotate the control knob 100 to "off" position, and thereafter causes the upper end of the slot 91 to engage the pin 92 of the rocker 83 to rotate the latter and pivot the latch 80 in counterclockwise rotation to release the roller 73. Thus, the cover 31 is automatically released and is swung upwardly to a position of approximately 45 degrees with respect to the top of the tub 30 under the influence of the spring 66. Since the motor 170 remains active, the propeller 33 continues its rotation and acts in the manner of an exhaust fan to discharge steam from the now open tub 30 and to circulate air, which is heated by the hot interior of the tub, past the washed and rinsed articles so as to evaporate moisture therefrom, tending to dry the same.

The steam expelling and drying operation continues until the trailing end of the cam lobe 230 moves past the cam follower end 228 of the contact arm 223 so that the follower end snaps upwardly into the depression 231 of the cam, as shown in Fig. 8. The result of this action is to cause the contact arms 223 and 224 to separate from the contact arms 233 and 234 (which are held down by the slide plate 247) so as to open the circuit and deenergize the motor 170. This action occurs at the point designated in the chart (Fig. 25), the motor then promptly coming to rest without the aid of a braking means. It is thus apparent that when the machine comes to rest, all the mechanisms assume their original positions, that is, all the elements are reset to start another washing and rinsing cycle. When the tub is again loaded, the cover is closed and the control knob is turned to "on" position.

The complete operating cycle of the machine is summarized as follows:

*Preparation*

(1) Load articles in tub, insert filled detergent container, close cover manually.

*Starting*

(2) Control knob turned to "on" position, switch closed, motor operative.

(3) Prerinse (automatic). Supply valve open, drain valve open, motor operative—to remove loose material from articles which, together with rinse water, immediately discharges into drain;

(4) Charge with washing water and detergent (automatic)—supply valve open, drain valve closed, motor operative—to supply measured amount of water for washing and charge with detergent;

(5) Wash (automatic)—supply valve closed, drain valve closed, motor operative—to remove all material from articles;

(6) Drain (automatic)—supply valve closed, drain valve open, motor operative—to discharge washing water and loosened material in suspension;

(7) Charge for flood rinse (automatic)—supply valve open, drain valve closed, motor operative;

(8) Flood rinse (automatic)—supply valve closed, drain valve closed, motor operative—to remove any residual loose particles of food material and to dilute to minute content such detergent-bearing washing water as may remain on articles and inside the tub;

(9) Drain (automatic)—supply valve closed, drain valve open, motor operative—to expel all flood rinse water;

(10) Charge for flood rinse (automatic)—supply valve open, drain valve closed, motor operative;

(11) Flood rinse (automatic)—supply valve closed, drain valve closed, motor operative—to remove any residual loose particles of food material and to dilute to minute content such detergent-bearing washing water as may remain on articles and inside the tub;

(12) Drain (automatic)—supply valve closed, drain valve open, motor operative—to expel all flood rinse water;

(13) Open cover (automatic)—supply valve closed, drain valve open, motor operative—to permit discharge of aqueous vapor, such escape being accelerated by continued rotation of the propeller, to produce drying by residual heat;

(14) Stop and reset (automatic)—supply valve closed, drain valve open, motor inoperative—to arrest operation of machine in reset condition, ready for future use.

It will be observed from the foregoing that the present invention provides a washing machine which is simple in construction and highly efficient in performing the functions of washing, rinsing, and drying dishes, silverware, and other articles of tableware. It is apparent that the machine is fully automatic in operation, so that once the machine is loaded with the articles and the motor started by the simple act of turning the control knob, it performs the several operations in sequence and, in addition, resets the control mechanism for a similar, subsequent operation.

The machine is extremely light in weight, and when embodied in a mobile unit it can be readily moved to a location adjacent a sink or to a place of storage, the weight being only a fraction of that of dishwashers of previous types.

Another feature of improvement resides in the means for imparting motion to the water throughout the interior of the tub to effect a thorough washing and rinsing of the articles, this means consisting of the propeller which is so designed that it scoops water from the bottom of the tub and propels it in all directions to adequately contact all the surfaces of the articles to be washed. By the unique sequential steps of the operative cycle disclosed herein it is possible to rotate the propeller continuously throughout the entire cycle, and this is a highly desirable feature since the use of an intermittently actuated clutch is wholly unnecessary. The combined action of the water supply nozzle and the rotating propeller produces a spray which is entirely adequate to effect perfect prerinsing of the articles with a minimum amount of water.

As an outstanding feature of improvement, in the present washing machine the driving means, the water supply means, the water propelling means, the water drain means, and the control means are embodied in a unitary assembly which is adapted for easy attachment to and removal from the tub. That is so say, the electric motor, the power take-off, the water pump, and propeller shaft are arranged in line, in the order named, and are carried by a housing which is readily connected to and removed from the tub. In addition, the water supply and drain valve mechanisms are also carried by the housing so that a subassembly unit capable of being assembled quickly apart from the tub is provided. The control cam mechanism and the reduction gear transmission therefor also form subassemblies which can be conveniently assembled. It is apparent, therefore, that the various subassemblies can be made and assembled into a complete operating unit which is readily applied to and removed from the tub, so that the manufacture of the machine and servicing thereof is greatly simplified. In the event that repair is necessary, the serviceman may remove the entire unit by simply removing the propeller and water supply tube, and removing the attaching screws to disconnect the operating unit from the tub. This unit may then be replaced by a previously reconditioned unit and taken to a shop where it can be repaired on a bench for subsequent installation in another machine. By the novel arrangement of elements disclosed herein, a single, direct drive effects operation of all the individual mechanisms, so that not only is the structure simplified but the machine can be manufactured at a fraction of the cost of previously used dishwashing machines.

It will be apparent to one skilled in the art that various modifications might be made in the construction of the machine which would fall within the spirit and the scope of this invention. Consequently, without limiting myself in this respect, I claim:

1. In a dishwashing machine, a washing receptacle having a water-agitating impeller therein, activating means suspended below said receptacle including a motor operatively connected to the impeller, said suspended means having incorporated therein means for supplying to the receptacle and draining therefrom such water as is used in washing in the receptacle, valve means carried by said suspended means for controlling the supply of water to and discharged from the receptacle, timing mechanism on said suspended means for controlling the operation of said valve means and impeller, and means on said suspended means between said motor and said receptacle operatively connected to said motor for driving said timing mechanism, said motor, said water supply valve means, said water discharge valve means and said timing mechanism together constituting a unit attachable to and disconnectible from said receptacle.

2. In a dishwashing machine, a washing receptacle having a water-agitating impeller therein, a cover for the washing receptacle, activating means suspended below said receptacle including a motor operatively connected to the impeller, said suspended means having incorporated therein means for supplying to the receptacle and draining therefrom such water as is used in washing in the receptacle, valve means carried by said suspended means for controlling the supply of water to and discharged from the receptacle, timing mechanism on said suspended means for controlling the operation of said valve means, said impeller, and said cover for the receptacle of the dishwashing machine, and power take-off means on said suspended means between said motor and said receptacle operatively connected to said motor for driving said timing mechanism, said motor, said water supply valve means, said water discharge valve means and said timing mechanism together constituting a unit attachable to and disconnectible from said receptacle.

3. In a dishwasher, a tub having a base in the bottom thereof, an impeller rotatable within the tub, a housing mounted on said base therebeneath, a motor suspended from said housing and having a shaft projecting upwardly therethrough upon which the impeller is mounted, a valve-controlled water supply conduit extending into the tub, the housing having an integral valve-controlled drain and also an integral overflow means located higher than the drain, said drain and overflow means being laterally offset from the axis of said impeller, a pump in said housing, the pump having a rotor mounted on the motor shaft, the pump being in fluid communication with the drain and overflow means and also having a discharge port, and a timing mechanism mounted between said motor and said housing for mechanically controlling the opening and closing of the drain valve and electrically controlling the opening and closing of the water inlet in sequence, said housing, said shaft, said valve-controlled water supply, sadi drain, said overflow means, said pump and said timing mechanism together constituting a unit attachable to and disconnectible from said base of said tub.

4. In a dishwasher, a tub having a base, a housing detachably mounted on the base, an impeller rotatable within the tub, a motor suspended beneath said housing and having a shaft projecting upwardly through said housing upon which the impeller is mounted, a valve-controlled water supply conduit extending into the tub, the housing having an integral valve-controlled drain and also an integral overflow means located higher than the drain, said drain and overflow means being laterally offset from the axis of said impeller, a pump within said housing, the pump having a rotor mounted on the motor shaft, the pump being in fluid communication with the drain and overflow means and also having a discharge port, and a timing mechanism mounted between said motor and said housing for mechanically controlling the opening and closing of the drain valve and electrically controlling the opening and closing of the water inlet in sequence, said housing, said shaft, said valve-controlled water supply, said drain, said overflow means, said pump and said timing mechanism together constituting a unit attachable to and disconnectible from said base of said tub.

5. In a dishwasher, a tub having a bottom wall, a housing detachably connected to and beneath said wall, an impeller rotatable within the tub, a tubular casing detachably connected to and depending from said housing, a motor suspended from said casing and having a shaft extending upwardly therethrough upon which the impeller is mounted, a water supply conduit extending into the tub, valve means for opening and closing said water supply conduit, the housing having walls defining a drain passage and also an overflow passage, said drain and overflow passages being in fluid communication with the interior of the tub at points offset laterally from the axis of said impeller, valve means for opening and closing said drain passage, a pump having a rotor mounted on the motor shaft within said housing, the pump being connected with the drain and overflow passages and also having a discharge port, a timing mechanism detachably mounted on said casing and a power take-off means within said casing and operatively connected to the motor shaft for mechanically controlling the opening and closing of the drain valve means and electrically controlling the opening and closing of the water supply valve means in sequence.

6. In a dishwasher, a tub having a bottom wall, a housing detachably connected to said wall therebelow, a tubular casing detachably connected to and depending from said housing, said housing having walls defining an offset drain passage and also an overflow passage located higher than the drain, an impeller rotatable within the tub, a motor detachably connected to and depending from said casing and having a shaft extending upwardly through said casing and said housing and upon which the impeller is mounted, a water inlet valve on the housing, a water supply conduit extending upwardly into the receptacle from the inlet valve, a drain valve in said offset drain passage, a pump having a chamber defined by walls of said housing, the pump having a rotor mounted on the motor shaft and rotatable within said chamber, the pump chamber being in fluid communication with the drain and overflow passages and also having a discharge port, and a timing mechanism detachably mounted between said motor and said housing for controlling the opening and closing of the water inlet in sequence.

7. In a dishwasher, a tub having a bottom wall and an opening in the top thereof, a cover pivoted on the tub to close the opening, cover-actuating means, a housing detachably mounted against the bottom of said wall and having walls defining a drain passage and an overflow passage communicating with the interior of the tub at points offset laterally from the axis of the impeller, a tubular casing detachably connected to and depending from the housing, an impeller rotatable within the tub, a motor detachably connected to the lower end of the casing and depending therefrom and having a shaft upon which the impeller is mounted, a water supply conduit extending into the tub, a water supply valve in said conduit, the housing having a drain passage and also overflow passage located higher than the drain, said passages being in fluid communication with the interior of the tub, a drain valve in said drain passage, said housing also having a pump chamber, a pump rotor mounted on the motor shaft and rotatable in said chamber, the pump chamber being connected with the drain and overflow passages and also having a discharge port, and a timing mechanism detachably mounted as a unit on said casing for electrically controlling the opening and closing of the water supply valve and for mechanically controlling the opening and closing of the drain valve, said cover-actuating means connecting the timing mechanism with the cover and operative to automatically raise the cover above the opening after the final opening of the drain valve and discharge of the water from the tub.

8. In a dishwasher, a tub having an opening in the bottom wall thereof, a housing detachably mounted against the bottom of the wall and over said opening, an impeller supported by and rotatable within the tub, a tubular casing detachably connected to the bottom of the housing and depending therefrom, a motor detachably connected to the lower end of the casing and depending therefrom, said motor having a shaft upon which the impeller is mounted, a valve-controlled water supply conduit extending into the tub, the housing having a valve-controlled drain passage and also overflow passage having an end located higher than the drain, a pump having a rotor mounted on the motor shaft and rotatable within a chamber provided in said housing, said chamber communicating with said passages, said housing having a discharge port from the pump, and a timing mechanism detachably mounted as a unit on a side of said casing for mechanically controlling the opening and closing of the drain valve and electrically controlling the opening and closing of the water inlet in sequence.

9. In a dishwasher, a washing receptacle, an impeller rotatable therein, a valve-controlled liquid supply and a valve-controlled drain for the receptacle, a pump for the drain, a housing detachably connected to the bottom of the receptacle and depending therefrom, a tubular casing detachably connected to the housing and depending therefrom, an electric motor detachably connected to and depending from the casing and having a power shaft extending upwardly through said casing, for operating the impeller and the pump, a timing mechanism detachably connected to said casing, and operatively connected to the motor within said casing, the timing mechanism being electrically connected to the valve-controlled supply and mechanically connected to the drain for operating the valves thereof, and an electrical circuit for the motor, said timing mechanism having a switch in said circuit for deenergizing the motor after conclusion of a washing cycle.

10. In a dishwasher, a washing receptacle, a pivoted cover, releasable locking means including a pivoted latch operative to maintain the cover closed, spring means operative to pivot said cover to open position upon release of the locking means, an impeller rotatable in the receptacle, a valve-controlled liquid supply and a valve-controlled drain for the receptacle, a pump for the drain, an electric motor for operating the impeller and the pump, manually-operated means for connecting the motor to a source of electrical energy, and a timing mechanism operatively connected to and adapted to be continuously operated by the motor when the latter is operated, the timing mechanism having cam means operatively connected to the valve-controlled supply and drain for operating the valves thereof and provided with means to release said locking means to effect opening of the cover by said spring means after opening the valve of the drain, said releasing means including a cam follower operatively connected to a reciprocable drag link, said drag link having a lost-motion connection with said latch, said mechanism also having a switch for disconnecting the motor from the source of electrical energy after conclusion of the washing cycle.

11. In a dishwasher, a washing receptacle, a pivoted cover, releasable locking means operative to maintain the cover closed, spring means operative to pivot said cover to open position upon release of the locking means, an impeller rotatable in the receptacle, a valve-controlled liquid supply and a valve-controlled drain for the receptacle, a pump for the drain, an electric motor for operating the impeller and the pump, manually-operated means for connecting the motor to a source of electrical energy, a timing mechanism operatively connected to and adapted to be continuously operated by the motor when the latter is operated, the timing mechanism having a shaft and cam means on the shaft operatively connected to the valve-controlled supply and drain for operating the valves thereof and provided with means to release said locking means to effect opening the cover by said spring means after opening the valve of the drain, said mechanism including a switch for disconnecting the motor from the source of electrical energy at any time between the beginning of the cycle and the final opening of the valve-controlled drain, said timing mechanism having means to prevent manual disconnection of the motor by said timing mechanism switch during the period between the final opening of the drain and the opening of the cover.

12. In a dishwasher, a washing receptacle having a bottom wall, a housing detachably connected to said bottom wall and depending therefrom, a tubular casing detachably connected to said housing and depending therefrom, an electric motor detachably connected to said casing and depending therefrom, said motor having a shaft extending upwardly through said casing and said housing and into said receptacle, an impeller mounted on the upper end of said shaft within the receptacle, a valve-controlled liquid supply means on said housing for injecting water into the receptacle, a valve-controlled drain means on said housing, a pump having a rotor on said motor shaft within said housing, a timing mechanism detachably mounted on a side of said casing and including cam means operative to control the actuation of said liquid supply valve and said drain valve, said timing mechanism having a power take-off shaft for driving said cam means, said shaft extending into said casing normal to the axis of said motor shaft, and meshing gears on said motor shaft and said power take-off shaft by which said timing mechanism is operated by said motor.

13. A dishwasher as defined in claim 12 in which said timing mechanism includes: a plate supporting the operating parts of the mechanism, said plate being detachably secured to said casing, a stud on said plate, a cam means rotatable on said stud, and a train of reduction gearing on said plate and drivingly connected between said power take-off shaft and said cam shaft.

14. A dishwasher as defined in claim 12 in which said liquid supply valve includes: a valve body having a flow passage therein, a valve stem slidable in the body, a spring operative to normally slide said stem in a direction to close said flow passage, said stem projecting from the body, an electromagnet, an electric circuit for said electromagnet, a switch incorporated in said timing mechanism and connected in the circuit, said switch being opened and closed by said cam means so as to energize and deenergize said electromagnet, said electromagnet having an armature, and a pivoted lever operatively connected between the armature and the valve stem so as to slide the latter in a direction to effect opening of said flow passage upon energization of the electromagnet.

15. In a dishwasher, a washing receptacle, a motor beneath said receptacle, an impeller mounted on the shaft of the motor within the receptacle, a pivoted cover for closing the open top of the receptacle, a spring-actuated locking latch pivoted on the receptacle and engageable with a roller on said cover to lock the latter in closed position, an electric circuit for the motor, a switch in said circuit, an actuating bar slidable vertically on the receptacle and having a lost-motion connection with a side of the latch, said bar being operative to close and open said switch, a control knob rotatable on the receptacle, a pin-and-slot connection between said knob and said bar whereby vertical sliding movement of the bar effects rotation of the knob, said knob having an arcuate lug thereon, a timing mechanism including a cam engageable with said actuating bar and operative to slide the same in one direction to close said switch and in the opposite direction to cause the bar to pivot said latch to cover-unlocking position, and a detent bar carried by the latch and adapted to be moved thereby to a first position out of the arcuate path of movement of said lug when the latch moves to cover locking position and to be moved into a second position within said path of movement when the latch moves to unlocking position so as to prevent rotation of the knob so as to lock the actuating bar in a switch-opening position and thus preclude energizing said motor when said cover is unlocked.

16. In a dishwasher, a washing receptacle, an impeller rotatable in said receptacle, an electric motor suspended beneath the receptacle and having a shaft driving said impeller, an electric circuit for the motor, said circuit including a switch, a switch actuator bar slidable vertically on the receptacle, a timing mechanism driven from the motor and including a cam operative to normally slide said bar in a direction to open said switch, a manually operable control knob movable on the receptacle and engageable with the actuating bar to slide the latter in a direction to cause it to close the switch, a pivoted cover for closing the open top of the receptacle, movable latch means engageable with the cover to lock the latter in closed position and release the same, said actuating bar being operatively connected to said latch and adapted to move the latch to releasing position slightly prior to final opening of said switch and deenergization of said motor, and detent means operatively connected to the latch and movable, upon movement of the latch to cover releasing position, to a position to engage said control knob so as to prevent movement of the actuating bar to switch-closing position while the cover remains open.

17. In a dishwashing machine having a tub and a cover pivoted thereon, racks for dishes and a motor-driven impeller for forcibly spraying the dishes with washing and rinsing water: a cover opening means, a single, self-contained, unit assembly adapted for mounting beneath the bottom of the tub, said unit embodying the impeller and an electric motor for driving the same, a water supply valve, drain and overflow passages, a drain valve and drain pump, and a motor driven timing mechanism for properly timing and mechanically operating the drain valve and the cover opening means and for electrically controlling the water supply and said motor.

References Cited in the file of this patent

UNITED STATES PATENTS

| Number | Name | Date |
|---|---|---|
| 1,240,298 | Best | Sept. 18, 1917 |
| 1,276,659 | Jensen | Aug. 20, 1918 |
| 1,323,216 | Cornwall et al. | Nov. 25, 1919 |
| 1,596,969 | Hedstrom | Aug. 24, 1926 |
| 1,787,220 | Walker | Dec. 30, 1930 |
| 1,884,180 | Pauly | Oct. 25, 1932 |
| 1,937,100 | Stoddard | Nov. 28, 1933 |
| 1,938,302 | Snyder | Dec. 5, 1933 |
| 2,000,720 | Snyder et al. | May 7, 1935 |
| 2,024,952 | Snyder et al. | Dec. 17, 1935 |
| 2,035,625 | Walker | Mar. 31, 1936 |
| 2,062,704 | Forsyth | Dec. 1, 1936 |
| 2,142,928 | Walker | Jan. 3, 1939 |
| 2,155,254 | Clark | Apr. 18, 1939 |
| 2,174,729 | Schlack | Oct. 3, 1939 |
| 2,276,801 | Stoddard | Mar. 17, 1942 |
| 2,385,264 | Ferris | Sept. 18, 1945 |
| 2,468,584 | Wotring | Apr. 26, 1949 |